Dec. 13, 1955

E. K. THOMPSON 2,726,791

DIVIDED FARM SEEDER

Filed Jan. 4, 1954

INVENTOR.
Eugene K. Thompson
BY
Maxwell V. Wallace
ATTORNEY.

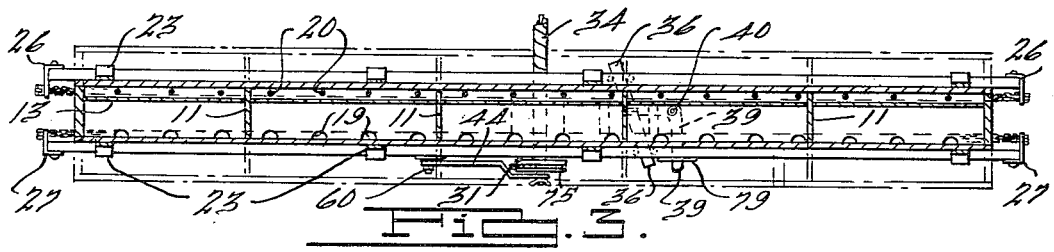
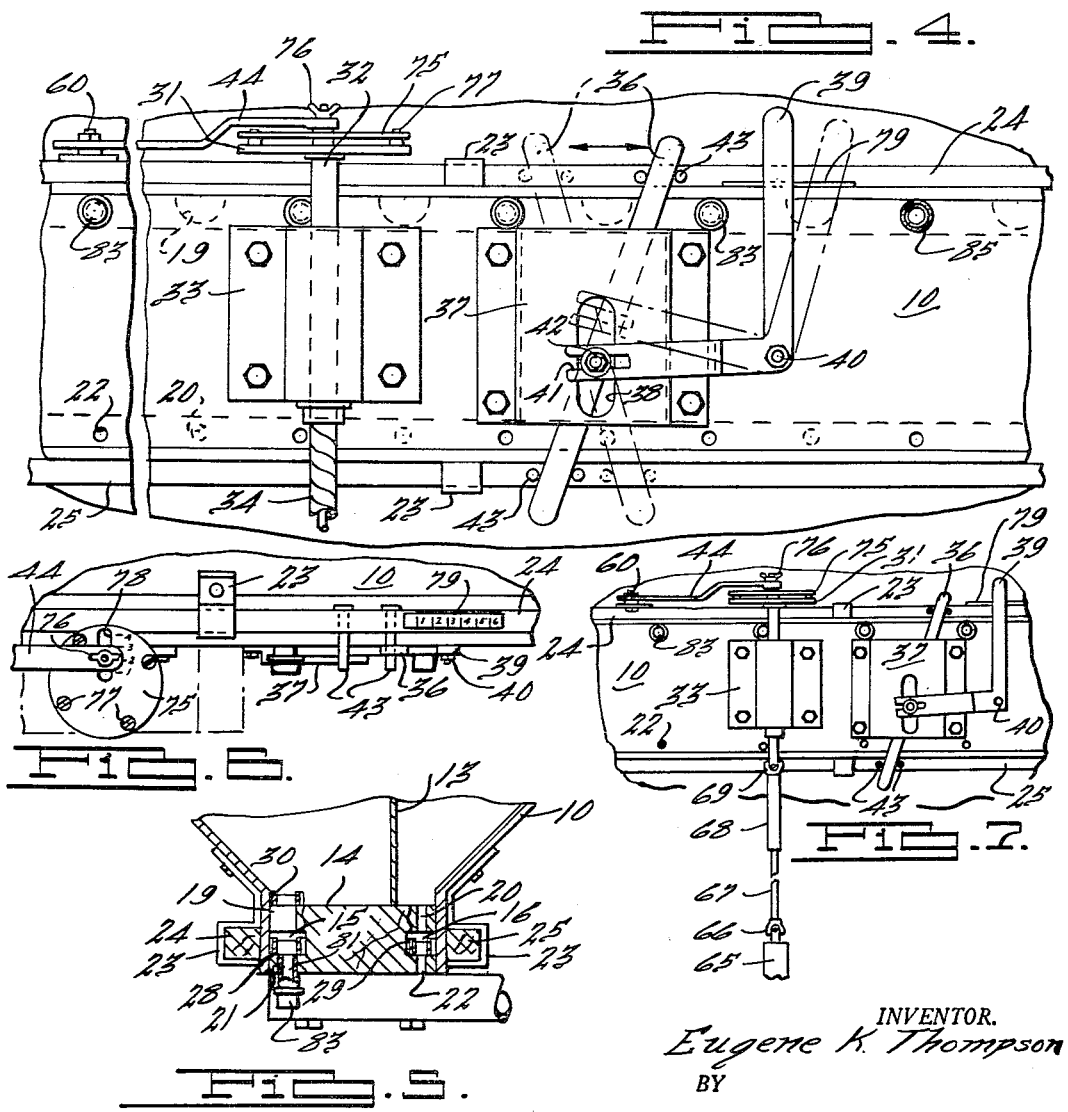

United States Patent Office 2,726,791
Patented Dec. 13, 1955

2,726,791

DIVIDED FARM SEEDER

Eugene K. Thompson, Tecumseh, Mich.

Application January 4, 1954, Serial No. 401,889

6 Claims. (Cl. 222—137)

This invention relates to seeders and more particularly to a new and improved type of farm seeder that will sow two different types of seed simultaneously. The seeder is designed to be mounted on the rear cultivator gangs of a standard farm tractor and to be used for seeding down corn ground, between the rows, although it may also be used to seed open soil by pulling a "cultipacker" back of the tractor. Some farmers like to sow rye, rye grass, broom grass and oats, which are known as large seeds, along with what are known as small seeds, such as red clover, sweet clover, alfalfa and timothy, and when the two are sown together from a single hopper type seeder, the small seeds settle to the bottom of the hopper and feed out first. The present invention discloses a seeder having a divided hopper so that the farmer can do a more thorough job of seeding, when seeding large and small seed simultaneously, or he can sow any amount of seed. For instance, if he wants to sow one bushel of brown grass and ten pounds of clover seed to the acre, he can do so, or two bushels of oats and fifteen pounds of red clover to the acre, he can do so. The seed is kept separate in the divided hopper and he has accurate distribution over the soil.

The principal object of the present invention is to provide a new and improved seeder having a divided hopper that may be detachably mounted on the rear cultivator gangs of a farm tractor, said seeder being capable of sowing two types of seed simultaneously.

Another object of the present invention is to provide a new and improved means for discharging seed from a divided hopper and regulating the amounts of seed to be discharged per acre.

A further object is to provide a new and improved means for discharging fertilizer or nitrogen pellets from one side of a hopper and regulating the amounts of fertilizer or nitrogen pellets to be discharged per acre.

A still further object is to provide a new and improved means for agitating the seed within the divided hopper of a seeder to cause the seed to be discharged evenly or unevenly.

The above and other objects will appear more clearly from the following more detailed description, and from the drawings, wherein:

Fig. 3 is a section taken substantially on line 3—3 of Fig. 1.

Fig. 4 is a partial bottom view enlarged to show the drive and agitating means.

Fig. 5 is an enlargement of the portion shown in circle in Fig. 2 and in Fig. 5.

Fig. 6 is a view showing a portion of the driving mechanism and agitating rod, with indicia thereon; and Fig. 7 is an alternate drive between the tractor power take-off and the seeder.

Figure 2:
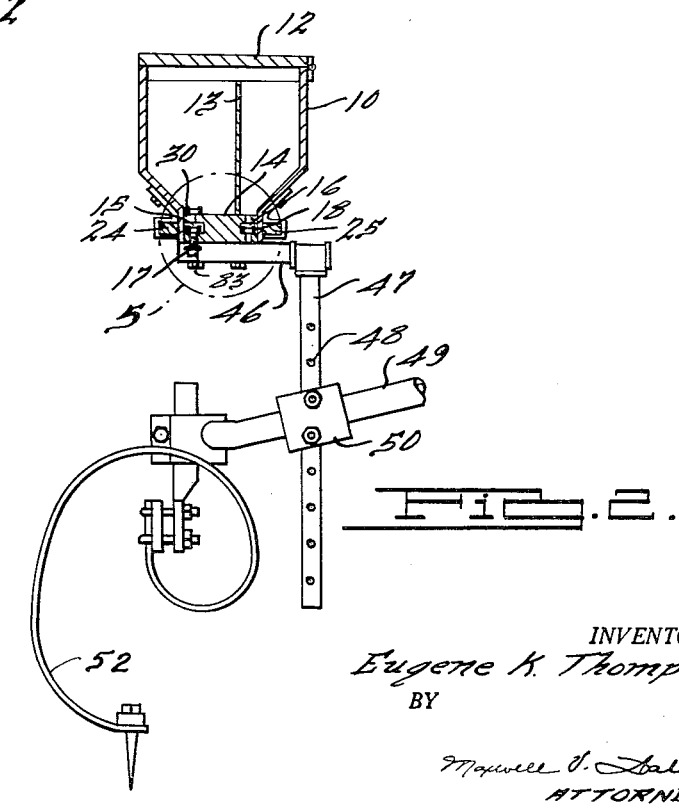
Fig. 2 is a section taken substantially on line 2—2 of Fig. 1.

Referring now to the drawings, the numeral 10 designates the hopper of the seeder fabricated preferably of heavy galvanized iron having therein transverse partitioning walls 11, and a hinged rain-proof cover 12, Fig. 3. As shown best in Figs. 2 and 5, there is provided a longitudinal dividing wall 13 which runs the entire length of the interior of the hopper and divides the same into two unequal parts. The lower portions of the sides of the hopper 10 are tapered so that the same is V-shaped, in cross section, and the bottom of the hopper comprises a single wooden two by four, 14, having a pair of opposed longitudinal grooves cut in the two inch sides thereof, 15, 16, adapted to receive chains 28, 29, for a purpose later to be described. A plurality of openings 19, 20, are provided in the two by four, above grooves 15, 16, to allow seed and grain to pass therethrough, openings 19, in large or grain side of hopper, being of greater diameter than those 20, in the smaller side of the hopper. A plurality of openings 21, 22, are provided below grooves 15, 16, but not in alignment with openings 19 and 20 above grooves 15, 16, said openings 21 (Fig. 5), in grain side of hopper, having fitted therein a plurality of short tubes 81 which extend below the bottom of the two by four, and are adapted to receive caps 83 to close the openings, when desired. These openings allow grain, seed and fertilizer to pass through openings above the chain grooves and be carried by the chains until they pass out through the openings in the two by four below the chain grooves and then to the ground.

Slidably supported on each side of hopper 10, by means of clips 23, are push rods 24, 25, push rod 24, which is mounted on what will be known as the grain side of hopper 10, the same being made of wood and is approximately three quarters of an inch square. Push rod 25, mounted on what will be called the grass side of hopper 10, is also made of wood, and is approximately one-half inch square. L-shaped brackets 26, 27 are provided, the same being secured to each end of push rods 24, 25, to receive and hold the ends of chain members 28, 29, Fig. 5, said chains passing through openings in the ends of the hopper 10 and nesting in grooves 15, 16. As shown best in Figs. 2 and 5, on the grain side of hopper 10, an additional chain member 30 is provided, the same being secured to brackets 27 and passing through hopper 10 on the bottom of same, immediately above groove member 15, for a purpose later to be described.

To reciprocate the push rods 24, 25, there is provided a wheel member 31, mounted on shaft 32, journaled in plate 33, said wheel member 31 having a slotted plate member 75 mounted upon said wheel member and spaced therefrom, said slot in said plate 75 having numbers thereon to form what will be known hereafter as a "grain indicator." Shaft 32 is rotated by means of a flexible cable member 34, which leads to a power take-off on the rear of the tractor, or may be rotated by take-off sleeve member 65, as shown in Fig. 6. A crank member 44 is provided to connect wheel 31 and push rod 24, said crank being connected to push rod 24 by means of a stud member 60 and the other end of crank 44 being adjustably secured to a slotted plate member 75 which is secured to wheel member 31 and held therefrom by means of screws 77. The crank 44 has an opening therein adapted to receive a bolt and wing nut assembly 76 which enables the crank end to be held in the slot 78 at a predetermined position. The slot 78 in plate 75 has a plurality of numbers thereon, and, as above outlined, is known as the "grain indicator," while there is also secured to push rod 24, immediately above one arm of bell crank 39, a plate 79, having a plurality of numbers thereon, which shall hereinafter be known as the "seed indicator."

To agitate push rods 24, 25, there is provided a rocker arm 36, Fig. 4, the same nesting beneath a plate 37, which is humped to allow arm 36 to pass freely between the plate and the bottom of the hopper. A slot 38 is provided in plate 37. A bell crank member 39 is pivotally mounted to the bottom of hopper 10 by means of bolt and nut member 40, one arm of said crank having cut therein a slot 41 adapted to engage a stub and nut member 42, said member 42 passing through slot 41 in arm of bell crank 39, said arm being located on the top side of plate 37 and through an opening in rocker arm 36, which is located beneath plate 37 and through an opening in rocker arm 36, which is located beneath 37 to hold the two members in fixed relationship. Rubber covered studs 43, project downwardly from push rods 24, 25, and are located each side of each end of rocker arm 36 to freely engage arm 36, and still allow said arm to move back and forth when actuated by push rod 24.

In Fig. 7 there is disclosed an alternate means of connecting the power take-off, found at the rear of the tractor, and shaft 32. In place of flexible cable 34 there is provided a power take-off sleeve member 65, which fits snugly over the power take-off shaft, not shown, said sleeve member having secured thereto a universal joint 66 to which is secured a solid square shaft member 67. Number 68 represents an additional square shaft member having a recess therein adapted to receive telescopically a portion of shaft member 67. A universal joint 69 is secured to one end of shaft 68 to couple the shaft to shaft 32.

Figure 1:
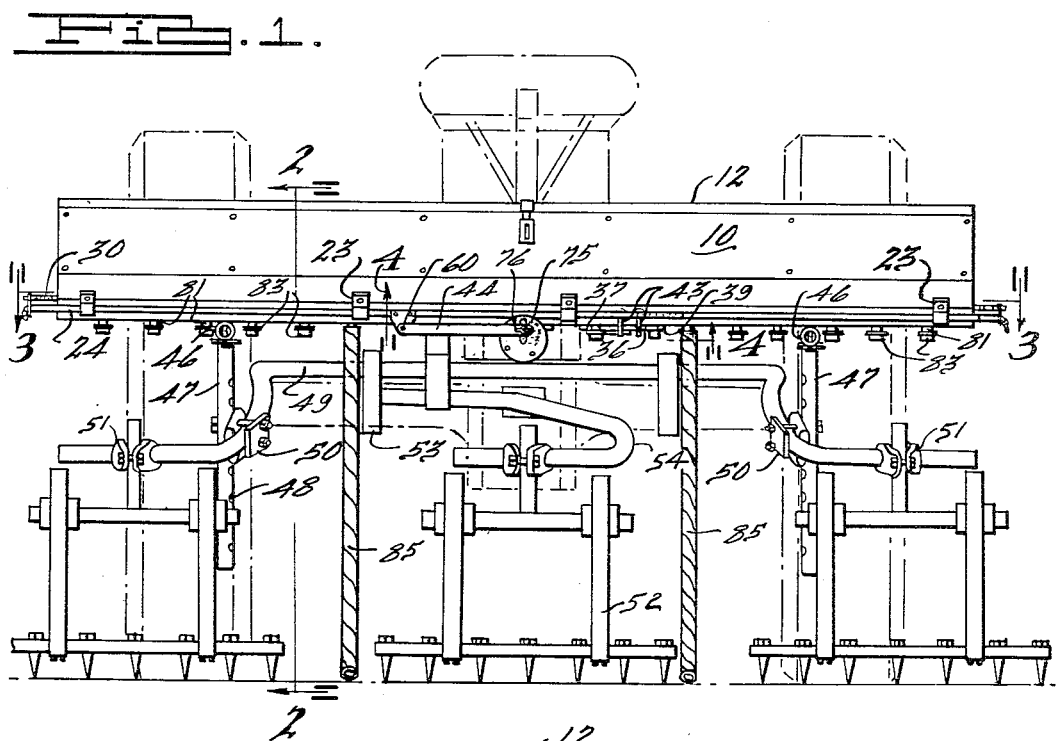
Fig. 1 is a rear elevation showing the seeder mounted on the rear cultivator gangs of a farm tractor.

The hopper 10 is mounted on a pair of opposed pipe members 46 and may be quickly detached by the removal of pins and a set screw. As shown best in Figs. 1 and 2, there is also secured to the pipe members 46 a pair of opposed pipe members 47 having a plurality of holes 48 therein. The numeral 49 designates a drag member 52 built as an integral unit supported upon pipe members and the numeral 50 designates clamping means for clamping the cultivator unit to pipe 47, at the height desired. The numeral 51 designates a clamping member to clamp the sections 52 of the drag, which contact the ground, to pipe 49. A pair of opposed brackets, 53 support pipe 49 and pipe 54, which in turn supports the center drag member 52, to the rear of the tractor frame.

The manner in which the device operates is as follows:

The seeder has been originally designed for the seeding down of cornfields, although it may be used for other seeding purposes with good results, the purpose being to sow mixed crops between the rows of corn so that they may have sufficient growth in the fall to cover part of the ground so as to check some soil erosion through the winter and spring months. The seeding helps to mellow up the soil, and makes seed germinate quicker. This way of farming has been found to be much better than plowing under corn stalks and weeds. It has also been found that if you plow under this seeding in the late spring, you will have a good manure crop and you are also building up the humus in the soil, which most soils lack.

The user must first determine what types of seed he wishes to use on a certain field. He then lifts lid 12, of hopper 10, and fills each side of the divided hopper, being sure to place the heavy seed or grain in the larger of the two hopper sections, and the smaller seed in the other portion of the hopper. Some types of seed must be sown from a greater height from the ground than others, and the hopper may be raised by simply removing the bolts from brackets 50 and moving pipes 47 up to the desired height and returning the bolts through brackets 50 and pipe 47, in the proper hole. It is also important that the drag members 52 are so positioned relative to the tractor that they will perform their respective part and the drag members may be adjusted by simply loosening the bolts in brackets 51 and allowing the pipe members supporting the drag members to slide to the position required, and then tighten clamps 51 again, which couple the drag pipe members to pipe assembly 49, which in turn is held in place by means of brackets 53 to the rear frame of the tractor. The seed is all sown in range of the drag so as not to leave seed lying on the surface without being covered.

Most seed companies have charts for use by farmers, which show the pounds per acre for various seeds, and most experienced farmers known from experience just how many pounds of a certain seed are needed to seed an acre of ground. The seeder herein disclosed has two indicators, one for grain, the same being located upon slotted plate member 75, Fig. 6, being numbered 1, 2, 3 and 4, each numeral representing the number of pecks of grain or other heavy seed, that will be sown when the rod 44 is set opposite the number of pecks required. Also shown in Fig. 6 is a grass or light seed indicator comprising a plurality of numbers appearing on a plate which is secured to push rod 24, reading from left to right: 1, 2, 3, 4, 5 and 6. Each number represents the number of pounds of light seed that will be sown when crank 36, Fig. 4 is properly set, as follows:

| | |
|---|---|
| 1 | Off |
| 2 | lbs__ 2 |
| 3 | lbs__ 6 |
| 4 | lbs__ 10 |
| 5 | lbs__ 15 |
| 6 | lbs__ 23 |

When the user has determined from his seeding chart, or from personal experience, just how many pecks and pounds he wishes to sow on a certain acre of ground, he first sets the grain indicator 75 by loosening wing nut 76 and sliding rod 44 up or down to slot 78, which must be in a vertical position until it is opposite the numeral corresponding to the number of pecks of heavy seed he wishes to sow—1, 2, 3 or 4—and then tightens the wing nut to hold rod 44 against said number. He then determines the number of pounds of light seed he wishes to sow on that particular acre of ground and loosens nut 40 of bell crank 39, Fig. 4, and nut 42, which allows rod 36 to be moved up or down in slot 38 of plate 37. Arm 39 of the bell crank is moved over until it is immediately under the number on plate 79, Fig. 6, that shows the number of pounds of light seed to be sown on that particular acre. Nuts 40 and 42 are then tightened, nut 40 holding arm 39 of the bell crank against movement and nut 42 allowing arm 36 to move back and forth between studs 43 on push rods 24 and 25. This setting varies the ratio of heavy to light seed to be sown. With this setting the seeder is ready to use and the tractor is driven to the ground to be seeded where the user simply has to attach the cable 34, Fig. 4 to the power take-off, or if the alternate form of take-off is used, Fig. 7, this type is coupled to the standard power take-off of the modern farm tractor. If the user desires to sow light seed only, turn grain indicator so that the slot therein is straight up and down and set crank opposite numeral 3, and turn wing nut 76 to hold it there, and then set light seed indicator 39 on the number corresponding to the number of pounds of seed to be sown, as shown in the table above. The seeder indicators have been worked out to operate on most tractors in second gear.

As the tractor is set in motion, the power take-off rotates and this in turn operates or rotates shaft 32, Fig. 4, to which is rotatably secured disc 75, which in turn drives crank 44, one end of which is secured to push rod 24 on the heavy seed side of hopper 10. This reciprocal movement is also imparted to push rod 25, on the light seed side of hopper 10 by means of rocker arm 36 which is seated between pins 43 secured to rods 24 and 25. As shown best in Fig. 3, chain members 28 and 30 are connected to each end of push rod 24 on the heavy seed side of hopper 10, one chain 28 riding in groove 15, cut in the bottom of hopper 10, and the other chain 30, rides above said groove on the floor of the hopper. Chain 29 rides in groove 16, cut in the bottom of hopper 10, Fig. 5, and is secured to both ends of push rod 25 on the light seed side of hopper 10. As push rods 24 and 25 reciprocate with chains 28, 29 and 30 secured thereto, heavy and light seed in hopper 10 is shaken through openings 19 and 20 and 21 and 22, openings 19 and 21 being on the heavy seed side of the hopper and being of greater diameter than openings 20 and 22 on the light seed side of hopper 10. These openings are not in vertical alignment so that heavy and light seed falls first through openings 19 and 20 and is carried by chains 28 and 29 until it falls through openings 21 and 22 to the ground. The additional chain 30, located in the heavy seed side of hopper 10, is an aid in getting the heavy seed into openings 19. As the heavy and light seed leave openings 21, 22, it intermingles as it falls into the path of drag member 52, Figs. 1 and 2, which in turn causes the seed to be sufficiently covered with earth so that it will not blow away from the area being sown.

If the user desires to distribute fertilizer or nitrogen pellets, the same is deposited in the grain side of the hopper. If it is desired to spread fertilizer the full width of the hopper he simply removes all the caps 83 from short tubes 81. If he desires to by-pass the corn leaves or stalks he can just remove the number of caps required and attach to each short tube 81 a long flexible tube 85 so that the fertilizer or pellets will be carried down near the ground and deposited thereon. The grain indicator is set as it is when grain is to be sown.

While I have described and illustrated a satisfactory device that has proven highly successful in practical operation, it will be understood that the invention is not limited to specific constructional details shown and described, but that many changes, variations and modifications may be resorted to without departing from the principles of my invention.

I claim:

1. A farm seeder for use in combination with a tractor, comprising a divided feed hopper adapted to be detachably mounted upon the rear of said tractor, said hopper having material discharge openings at spaced points in the bottom thereof, rod members slidably mounted upon the lower opposed sides of said hopper, chain members so located in the bottom of said hopper that they pass over said material discharge openings, the ends of said chains being secured to the ends of said slidable rods, and means for actuating said rods for reciprocating said chains relative to said hopper.

2. A farm seeder for use in combination with a tractor, comprising a divided feed hopper, said hopper having a longitudinal partition therein to divide the same into two seed carrying compartments, a bottom member for said feed hopper having opposed longitudinal grooves therein, material discharge openings at spaced points above and below said grooves in each side of said divided hopper bottom member, slidable opposed rod members supported upon the lower portion of said hopper, chain members slidably located within said opposed grooves in said bottom member having the ends thereof secured to the ends of said slidable rods, and means for actuating said rods for reciprocating said chains relative to said hopper.

3. A farm seeder for use in combination with a tractor, comprising a divided feed hopper, said hopper having a longitudinal partition therein to divide the same into two seed carrying compartments, a bottom member for said feed hopper having opposed longitudinal grooves therein, material discharge openings at spaced points above and below said grooves in each side of said divided hopper bottom member, slidable opposed rod members supported upon the lower portion of said hopper, chain members slidably located within said opposed grooves in said bottom member having the ends thereof secured to the ends of said slidable rods, and means for actuating said rods for reciprocating said chains relative to said hopper, said means comprising a wheel member rotatably supported upon and protruding outwardly from the bottom of said hopper, a crank member having one end thereof secured to said wheel member and the other end thereof secured to one of said rod members, an arm member pivotally supported upon the bottom of said hopper and having the ends thereof slidably contacting both of said rod members, and power means for rotating said wheel member and imparting reciprocal movement to said rods.

4. A farm seeder for use in combination with a tractor, comprising a divided feed hopper, said hopper having a longitudinal partition therein to divide the same into two seed carrying compartments, a bottom member for said feed hopper having opposed longitudinal grooves therein disposed on each side thereof, material discharge openings at spaced points above and below said grooves, a slidably opposed rod member supported upon the lower outer portion of said hopper, a first chain member slidably supported within said opposed grooves in said bottom member, the ends of said chain being secured to the ends of said slidable rod, a second chain member secured to the ends of one of said slidable rods and resting upon the bottom of one side of said divided hopper means, means for actuating said rod for reciprocating said chains relative to said hopper, said means comprising a wheel member rotatably supported upon and protruding outwardly from said hopper, said wheel having a slotted plate with indicia thereon secured thereto and spaced therefrom, power takeoff means from said tractor to rotate said wheel member, a crank member having one end thereof slidably secured within said slot in said wheel plate, the other end thereof slidably secured within said slot in said wheel plate, the other end of said crank being pivotally secured to said rod, a second rod member slidably mounted on the opposite side of said hopper, means for regulating the thrust of said second rod member, said regulating means comprising a transverse bar member having one end attached to said first rod member and the other end attached to said second rod member, a slotted plate member secured to the bottom of said hopper and spaced therefrom, said transverse bar member being pivotally attached to said plate in said slot, and bell crank means attached to said transverse bar member for regulating the reciprocating thrust of said transverse member.

5. A farm seeder for use in combination with a tractor, comprising a divided feed hopper, said hopper having a lonigtudinal partition therein to divide the same into two seed carrying compartments, a bottom member for said feed hopper having opposed longitudinal grooves therein disposed on each side thereof, material discharge openings at spaced points above and below said grooves, a slidably opposed rod member supported upon the lower outer portion of said hopper, a first chain member slidably supported within said opposed grooves in said bottom member, the ends of said chain being secured to the ends of said slidable rod, a second chain member secured to the ends of one of said slidable rods and resting upon the bottom of one side of said divided hopper means, means for actuating said rod for reciprocating said chains relative to said hopper, said means comprising a wheel member rotatably supported upon and protruding outwardly from said hopper, said wheel having a slotted plate with indicia thereon secured thereto and spaced therefrom, power take-off means from said tractor to rotate said wheel member, a crank member having one end thereof slidably secured within said slot in said wheel plate, the other end of said crank being pivotally secured to said rod, a second rod member slidably mounted on the opposite side of said hopper, means for regulating the thrust of said second rod member, said regulating means comprising a transverse bar member having one end attached to said first rod member and the other end attached to said second rod member, a slotted plate member secured to the bottom of said hopper and spaced therefrom, said transverse bar member being pivotally attached to said plate in said slot, and a bell crank member pivotally secured to the bottom of said hopper cooperating with indicia means carried by said second rod for regulating the amplitude of the reciprocating thrust of said transverse bar member.

6. A farm seeder for use in combination with a tractor, as set forth in claim 5, wherein the lower openings in the bottom of the larger of the two seed carrying compartments have inserted therein small tube members adapted to detachably receive flexible tube members for use when distributing fertilizer, or the like, or to receive cap members to close said openings, when not in use.

No references cited.